United States Patent [19]

Caspari

[11] Patent Number: 5,205,637
[45] Date of Patent: Apr. 27, 1993

[54] TOUCH OPERATED LIGHTING ATTACHMENT

[76] Inventor: Fred Caspari, 2929 Ridge Rd., Long Beach, Ind. 46360

[21] Appl. No.: 836,103

[22] Filed: Feb. 14, 1992

[51] Int. Cl.$^5$ .............................................. F21V 33/00
[52] U.S. Cl. ..................................... 362/109; 362/23; 362/157; 362/253; 362/295
[58] Field of Search ................. 200/DIG. 2; 307/116, 307/308; 362/396, 23, 109, 98, 99, 190, 191, 85, 253, 295

[56] References Cited

U.S. PATENT DOCUMENTS

| | | | |
|---|---|---|---|
| 1,828,543 | 10/1931 | Phillips | 362/23 |
| 3,381,122 | 4/1968 | Boyle | 362/99 |
| 4,432,042 | 2/1984 | Zeller | 362/99 |
| 4,700,634 | 10/1987 | Mille et al. | 362/98 |
| 4,751,620 | 6/1988 | Wright et al. | 362/396 |
| 4,881,155 | 11/1989 | Gahagan | 362/191 |
| 4,885,666 | 12/1989 | Yu | 362/189 |
| 4,893,222 | 1/1990 | Mintzer | 362/109 |
| 4,949,230 | 8/1990 | Burmeister | 362/109 |
| 5,010,462 | 4/1991 | Mintzer | 362/109 |
| 5,055,977 | 10/1991 | Acquanetta | 362/109 |

FOREIGN PATENT DOCUMENTS 2503328 10/1982 France ................. 362/98

Primary Examiner—James C. Yeung
Attorney, Agent, or Firm—Welsh & Katz

[57] ABSTRACT

An illumination device for a remote control console having at least one light source and a control box having switching circuitry for selectively providing an electric current to illuminate the light source. The control box has an upper cover panel, a lower cover panel, and an internal circuit board panel. The switching circuitry is operationally connected to the control box and the light source. The switching circuitry provides an electrical power supply to the light source when activated to light the keyboard console. The light source is operationally connected to the post assembly and the control box. The post assembly is provided and is adjustable for positioning the light source at various selected positions directly over the keyboard console. The control box is adapted for releasable attachment to the body of the remote control console.

14 Claims, 3 Drawing Sheets

TOUCH OPERATED LIGHTING ATTACHMENT

The present invention relates generally to a touch operated flashlight for use in connection with remote control keyboards and the like.

BACKGROUND OF THE INVENTION

The low cost of modern electronic technology has made remote control units affordable for the majority of businesses and individuals. In fact, it is not uncommon for the typical business or household to have multiple remote control units, such as for televisions, receivers, video recorders, compact disc players and other electronic, audio-visual equipment. These remote control units are frequently used in areas of the home or office that are dark or dimly lit, which makes it difficult to select a proper function or channel key. The frustration caused by selecting the wrong function or channel is compounded when the user must find the nearest light switch or repeatedly attempt to select the correct key, thereby disrupting the comfort of the person or the impact or presentation of the audio or visual work.

There have been various attempts to address the problem of inadequately lit remote controls, such as by providing an independent light source attached to or in proximity with the remote control console. However, they have been less than satisfactory in providing a lighting device for remote control consoles that does not disturbingly reflect light into the user's eyes and which is easy to operate.

Currently available remote control console illuminators require the user to manually switch the light source on each time the light is required for operating the remote control unit. Typically, these illuminators are battery operated and require the user to actuate the switch of the light source by pushing or turning a button, operate the remote control unit and then deactivate the light by pushing or turning the button. Often the user may decide to bypass all the repeated steps by simply leaving the light on. Also, currently available light attachments are not configured to provide optimum lighting, while not causing obstructive or distracting reflections and shadows. Frequently, the placement of the light source causes the user's hand to block the light when attempting to reach onto the keyboard to select the desired function key.

Thus, currently available illuminators are inconvenient to operate, are wasteful of battery life, cause distracting reflective light and shadows and do not provide optimum illumination. Eventually, the user may decide it is easier and cheaper to simply return to their previous "best guess" method of selecting the desired channel or function key.

Accordingly, it is an object of the present invention to provide a light source which can be removed and attached to a remote control console.

It is a further object of the present invention to provide an easy to use light source which is removably attached to the bottom of a remote control unit, and which is adjustable to direct optimum amounts of light onto the keyboard of the remote control console.

It is yet another object of the present invention to provide a touch activated light source for a remote control unit which can be operated with one hand, and which can be selectively adjusted with respect to the remote control unit so as to prevent obscuring of the light path by the user's hands, keys or other objects.

In accordance with the present invention, all of these objects, as well as others not herein specifically identified, are achieved generally by the present touch operated lighting attachment. More specifically, the present touch operated lighting attachment includes a lighting attachment for a remote control keyboard having a light source operationally connected to a central body or control box through a post assembly. The post assembly is fully adjustable for positioning at various selected positions relative to the remote control console and over the keyboard. The control box consists of an upper cover panel, a lower cover panel and an internal circuit board panel. The control box houses a switching circuit that is formed on the circuit board panel and which is operationally connected to the light source. The control box can be releasably attached to the body of a remote control console. Additionally, the present lighting attachment or illumination device includes an electronic switch that is activated and conducts an electrical current to illuminate the light source when the user simultaneously touches touch activation plates located on the control box.

BRIEF DESCRIPTION OF THE DRAWINGS

The above objects and other objects and advantages of the present invention will become more readily apparent from the description of the present invention which follows, when read in conjunction with the attached drawings in which.

DETAILED DESCRIPTION OF THE PREFERRED EMBODIMENT

Figure 1:
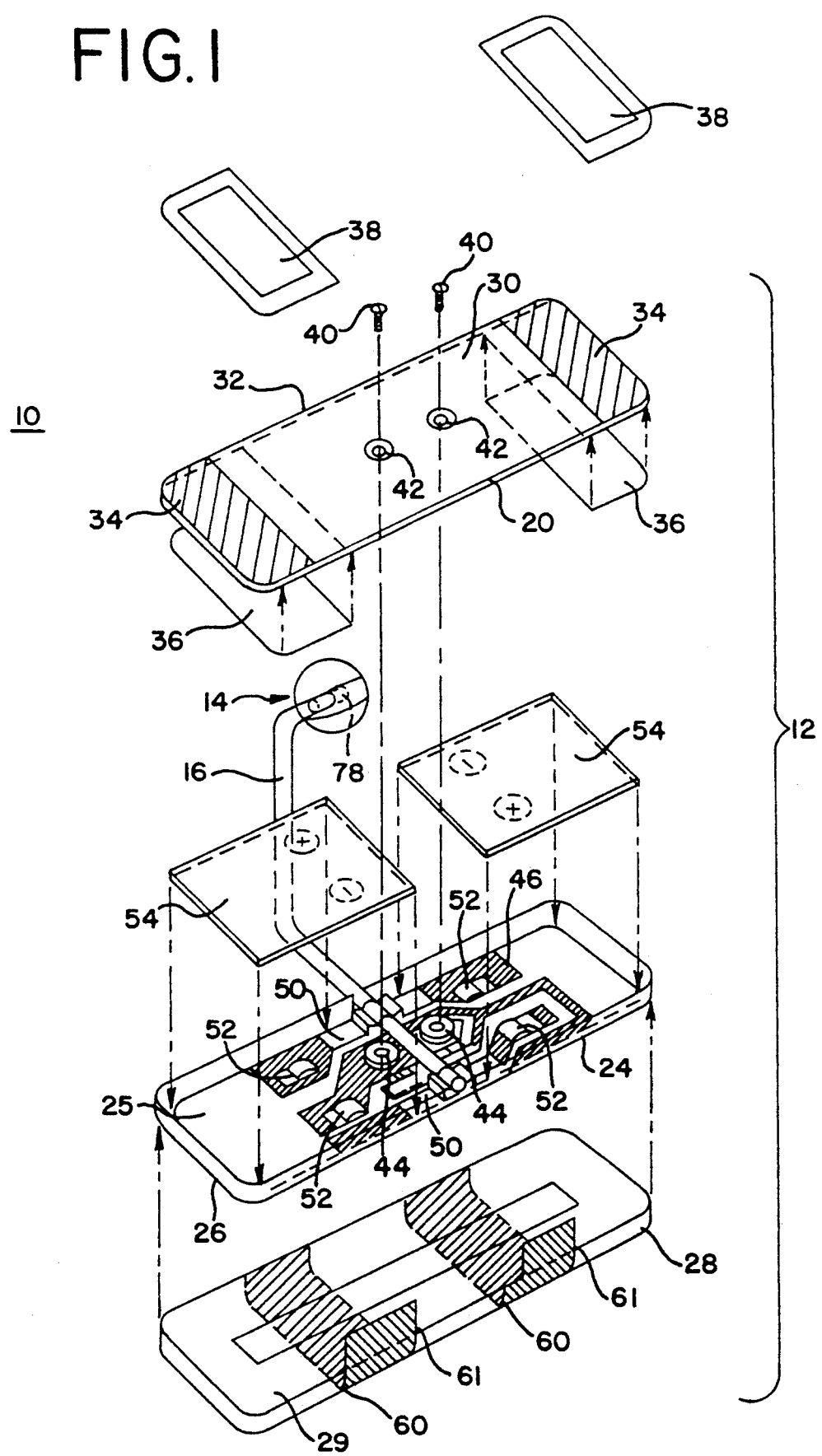
FIG. 1 is an exploded side plan view of the device.

Referring now to FIGS. and 2, shown with its constituent components separated, is the present touch operated lighting attachment or illumination device, generally designated at 10. The body of the lighting attachment 10 is essentially a control box 12 having a plurality of panels: an upper cover panel 20, an internal circuit board panel 24, and a lower cover panel 28. It should be understood that the number of panels or exact construction of the control box 12 can be varied without departing from the objects of the present light attachment 10.

The control box 12 is operationally connected to illumination means, for providing at least one light source 14. The illumination means can be configured as an ordinary light bulb or other device known to provide light when electronically actuated. The light source 14 is operationally connected to a post assembly 16 that is adjustable for positioning at selected positions directly over the keyboard of the remote control console. In order to maintain low cost and the portability of the present light attachment 10, the light source 14 is preferably a low voltage light bulb fed from a lightweight and portable battery source.

As shown, the panels 20, 24 and 28 are generally rectangularly shaped, but it is conceivable that other configurations can be used without departing from the scope of the present invention. It should be understood that the lighting attachment 10 is intended to be adaptable for use with typical remote control consoles, or other types of consoles. It is intended that the lighting attachment 10 become virtually integral with the remote control console so that its operation becomes transparent to the user. Accordingly, the panels 20, 24, and 28 are generally configured for application to an elongated or a rectangularly shaped remote control console. The panels 20, 24, and 28 should be manufactured from a durable, lightweight material that will not add excess bulk to the remote control console.

Upper panel 20 includes means for releasably attaching said lighting attachment 10, as a unit, to a remote control keyboard or console. As shown, the upper panel 20 has two surfaces; an outer surface 30 and an inner surface 32. The outer surface 30 has disposed at its ends magnets 34. These magnets 34 can be secured to the inner surface 32 and magnet holding plates 36 of the upper panel 20 using adhesives. Alternatively, the magnets 34 may be press fit into place when the upper panel 20 is secured to the remaining panels 24 and 28. The magnets 34 are configured and arranged so as to align with keeper plates 38. The keeper plates 38 are made of material which is magnetically attracted to magnets 34, and together with the magnets 34, function to magnetically attach the light attachment 10, as a unit, to the remote control console. The keeper plates 38 may be secured to the remote control console, typically the lower surface of the console, using an adhesive, such as adhesive tape or the like. It will be appreciated that other means that may not employ magnets can be used to hold or removably attach the light attachment 10 to a specific type of remote control console without departing from the principles of the presently described invention.

The upper panel 20 also includes fastening means for removably fastening the upper panel 20 to the internal circuit board panel 24. Typically, the fastening means will be those generally used to fasten items of this type together, such as at least one threaded screw, pin or the like. If screws 40 are utilized, then the upper panel 20 will also have at least an equal number of trough bores 42. The screws 40 extend through the bores 42 and are secured to the circuit board panel 24. The circuit board panel 24 may include threaded stand-offs 44 that releasably accept the screws 40 without disturbing or obstructing any of the electrical contacts or circuitry housed within the control box 12. The threaded stand offs 44 are soldered to conductive foil, such as copper foil and onto the circuit board panel 24.

The circuit board panel 24 houses switching circuitry and a power supply on an inner surface 25, which provide a system of conductivity to illuminate the light source 14. More specifically, the circuit board panel 24 includes at least one switching means 46, such as transistor circuitry, that is operationally connected to the body or control box 12, the light source 14, and the post assembly 16. The circuit board panel 24 also includes bearing springs 50 and battery contact springs 52. The bearing springs 50 are used to attach the stem 16 operationally to the circuit board 24. The battery contact springs 52 are configured and arranged onto the circuit board panel 24 so as to provide electrical conductivity between the power supply, such as batteries 54, and the switching means 46. The batteries 54 are pressed against the contact springs 50 to provide conductivity when the upper panel 20 is secured to the circuit board panel 24. Further, the battery contact springs 54 are arranged to correspond with the positive and negative feeds on the batteries 54.

The lower cover panel 28 is essentially a shell adapted to receive and protect the inner circuit board panel 24. To this end, the lower cover panel 28 should be formed of a non-conductive material and be dimensioned to receive the circuit board panel 24. The circuit board panel 24 is adhesively mounted to the inner surface 29 of the lower cover panel 28. The preferred method of adhesion is a strip of double-sided adhesive tape, having one side adhered to the lower surface 26 of the circuit board panel 24 and the opposite side adhered to the inner surface 29 of the lower cover panel 28.

It is anticipated that the light attachment 10 will operate with numerous types of electronic circuitry or circuit arrangements without departing from the objects or scope of the present invention. However, it is preferred that the switching means 46 be an enhanced field effect transistor (FET). The switching means 46 may include an external switching mechanism, such as a push button or similar activation means. However, to overcome some of the deficiencies of currently known lighting accessories, it is preferred that the present light attachment 10 be touch activated. If touch activated, illumination of the light source 14 is actuated when the user touches or grasps the control box 12 of the light attachment 10. The touch activation feature eliminates the need to switch the light on or off manually each time the user desires to access the remote control console keys.

To this end, the lower cover panel 28 includes coated copper foil that forms touch sensitive panels or plates 60. The foil is disposed onto a portion of the outer surface 27 of the lower cover panel 28 and extended onto the circuit board panel 24 to complete the switching means 46. An upper end 61 of the plates 60 are soldered, or otherwise operationally connected, to the switching means 46 at connection points 60a and 60b (shown in FIG. 3). In operation, when the touch sensitive plates 60 are simultaneously touched by the user, the plates 60 complete an electronic circuit and a sufficient amount of voltage is conducted to the light source 14 to illuminate the remote control keyboard onto which the lighting attachment 10 has been attached.

Figure 3:
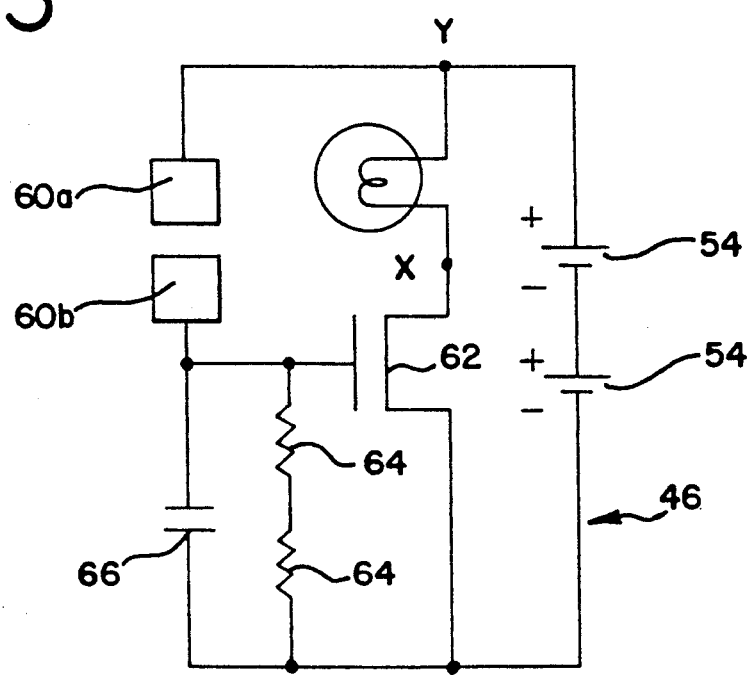
FIG. 3 is a schematic of the electronic circuitry of the lighting attachment.

As shown in FIG. 3, the electronic circuitry or switching means 46, is a field effect transistor (FET) that includes a gate assembly 62. The gate 62 is completed and will conduct the requisite amount of electrical voltage, provided by batteries 54, when the switching means 46 is activated by the user. The circuit is completed and the FET conducts electricity when the user touches or holds the touch sensitive plates 60 simultaneously, thereby connecting the gate 62 with the positive plate of plates 60. In effect, the light attachment 10 is always in a ready state. Once the light attachment is grasped by the user, the ready state is converted to an active state. If touch sensitive plates 60 are not utilized, and other activation means are substituted therefor, then the FET or other type of circuitry used will be completed in a manner according to that specific type of circuitry.

It is contemplated that the switching means 46 will also include resistors 64 that function to return the gate 64 to a source potential from its actual or activated state once the user releases or otherwise switches off the light attachment 10. Capacitors 66 can also be included to prevent damage to the gate 62 by absorbing excess charge, such as static electricity, that may be inadvertently provided to the lower cover panel 28 by the user.

Figure 2:
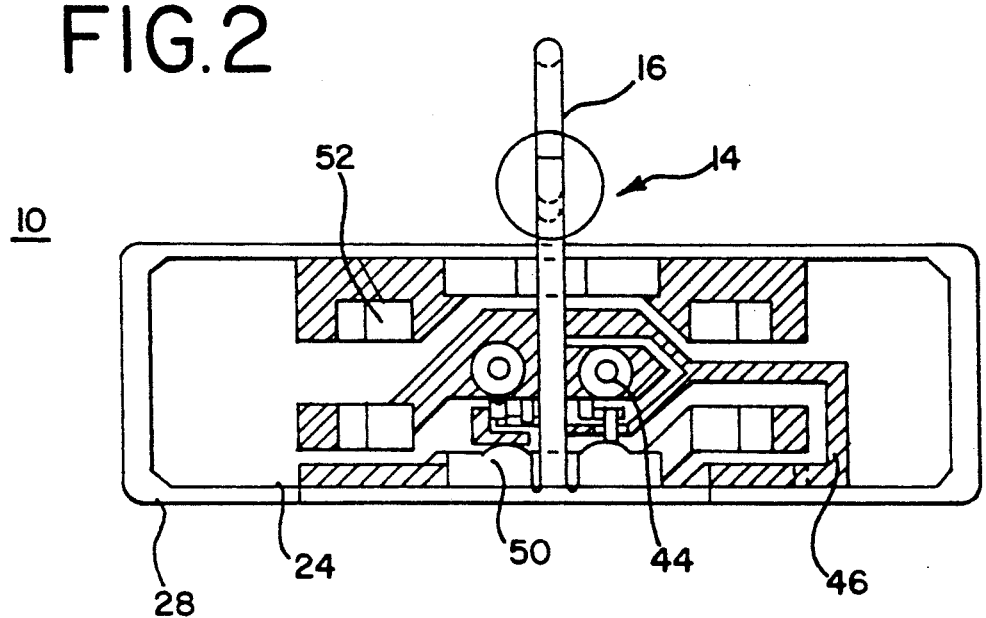
FIG. 2 is a top view of the lighting attachment shown without the cover plate and exposing the electronic circuitry of the device.
Figure 5:
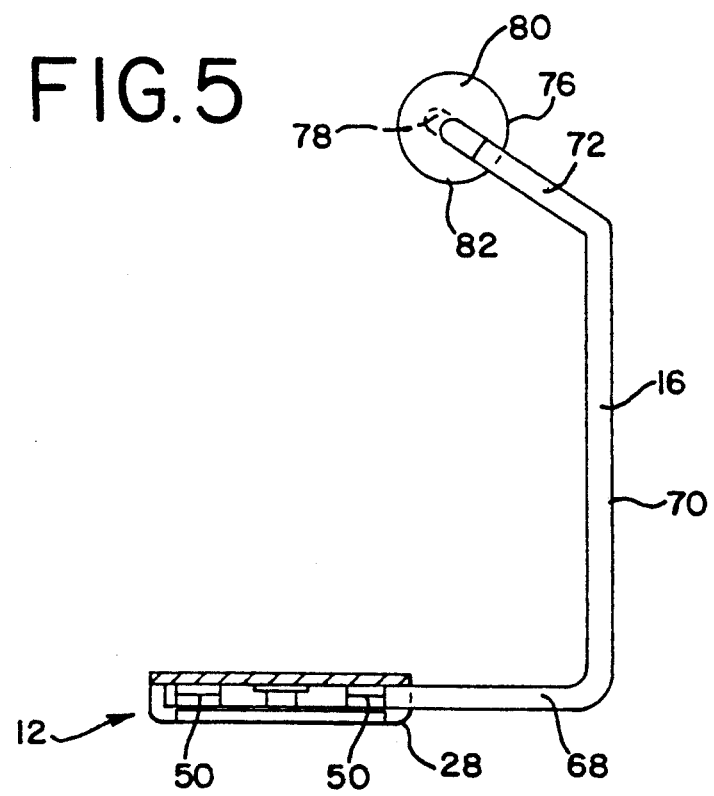
FIG. 5 is a left side view of the lighting attachment.

Shown most clearly in FIGS. 1, 2 and 5, the post assembly 16 is operationally attached at one end to the light source 14. Further, the post assembly 16 is operationally connected at its other end to the control box 12 through the circuit board panel 24. The post assembly 16 should be configured and arranged so that the light source 12 is sufficiently high and positionable to provide adequate lighting to the remote control console without obstructing the keyboard. The post assembly 16 is shown as generally C-shaped, but other configurations are equally contemplated.

The post assembly 16 includes a connector end 68, a stem 70 and an angled/distal end 72. The connector end 68 is secured to the circuit board panel 24, such that the entire post assembly 16 can be adjusted or rotated to position the light source 14 for optimum illumination of the remote control console keyboard. Further, because the post assembly 16 is adjustable with respect to the remote control keyboard, reflective lighting can be redirected towards the user's eyes to provide even further illumination of the keyboard without obstructing the user's visibility.

The post assembly 16 can be operationally attached to the circuit board panel 24 with a transverse slot or other retaining structure. Preferably, copper bearings springs 50 will be used to retain the post assembly 16 while permitting vertical adjustment of the post assembly 16 in relation to the remote control console or keyboard. The bearing springs 50 compress the connector end 68 against the circuit board panel 24, while leaving the post assembly 16 fully adjustable. Further, the post assembly 16 is more securely held in place because it is retained between the upper cover panel 20 and the circuit board panel 24 once the upper cover panel 20 is secured to the circuit board panel 24.

Figure 4:
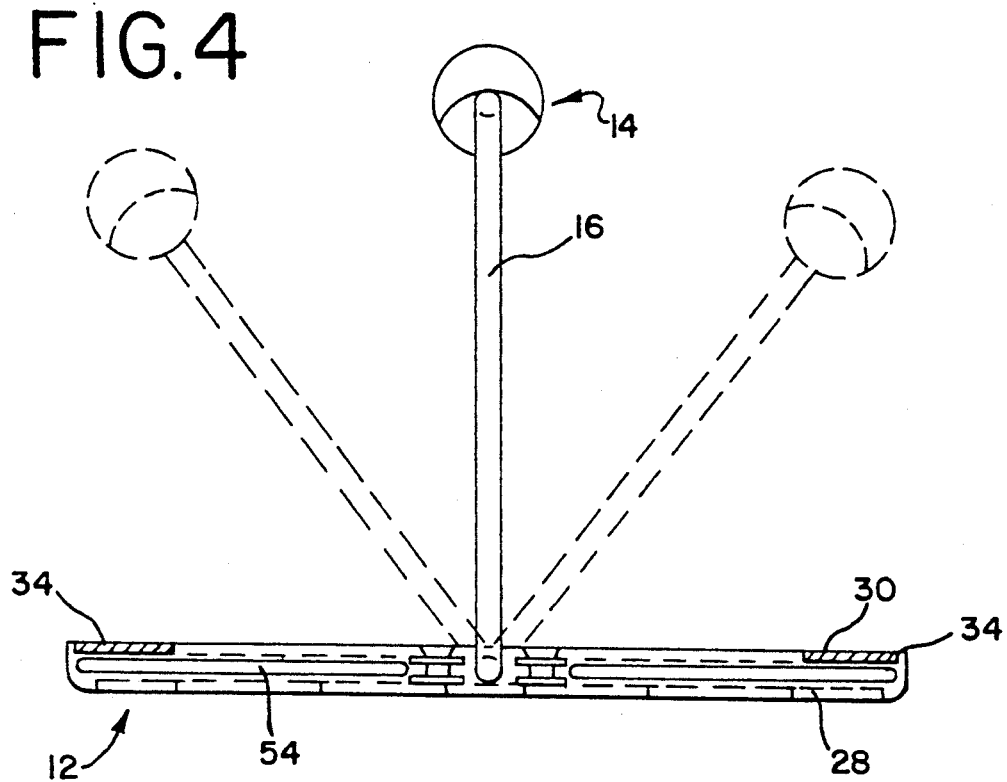
FIG. 4 is a side view of the lighting attachment showing alternate positions of the stem and light attachment.

As shown in FIG. 4, the entire post assembly 16 can be vertically adjusted or pivoted with respect to the remote control console to provide optimum illumination of the remote control console or keyboard. The user may find it beneficial to adjust the post assembly 16 to direct unwanted glare and obstructive shadows away from the line of vision. Further, because the post assembly is adjustable, optimum illumination can be obtained by directing the light of the light source 14 from the keyboard surface to the eyes of the user. Additionally, the post assembly 16 can be folded flat to facilitate shipment or storage of the lighting attachment 10 as a unit.

Referring to FIGS. 4 and 5, the light source 14 is operationally connected to the post assembly 16 and thereby to the circuit board panel 24 by electronic wiring (not shown) that passes through the post assembly 16. The connective wiring is attached to the control box 12, such as by soldering, at points X and Y on the switching means 46. Also shown, the light source 14 includes a plastic sphere 76 which houses a light bulb 78 of the light source 14. The sphere 76 can be bored or otherwise adapted to press fit or snap onto the distal end 72 of the post assembly 16. Further, the sphere 78 can be rotatably adjusted about the distal end 72 for positioning or angling the light source 14 above the remote control console keyboard for optimum illumination. It is anticipated that the upper half 80 of the sphere 76 will be painted or treated with an opaque reflective substance, such as white paint, to reflect light downwards to the remote control console. The lower half 82 of the sphere 76 remains transparent to form a protective lens that can be provided with means for focusing or directing the light from the light source 14 onto the remote control console or keyboard.

In the practice of the invention, the user can removably attach the light attachment 10 to the bottom of a remote control keyboard using the attachment means provided, such as magnets 34. Once attached, the light attachment 10, namely the post assembly 16 and light source 14, can be adjusted to direct optimum light onto the remote control keyboard. Once fully adjusted, the light attachment 10 will provide a sufficient amount of light for the user to operate the remote control console in the dark or in dimly lit rooms.

Essentially, the light attachment 10 becomes an appendage of the user's remote control console and will become virtually transparent to the user. If the touch activation plates 60 are utilized, then the light source 14 will be automatically illuminated when the user grasps or holds the light attachment 10. After the light source 14 is activated, the user can read the keyboard and select the desired channel or function quickly and easily. The user can select the correct channel or function key without having to disrupt the comfort of the user or the presentation of the audio or visual work by having to move and activate the lighting in the room. Similarly, the light source 14 will automatically be deactivated when the user releases or sets the remote control console down. Accordingly, an important advantage of the present light attachment 10 is that it does not require multiple or complicated steps to operate. Furthermore, because the light source 14 is easily deactivated, battery life is conserved and disturbing light from the light attachment 10 is eliminated. Finally, because the present light attachment 10 is portable and collapsible, it can be transported and utilized on different remote control console the user may own.

The foregoing specification describes only the preferred embodiment of the present invention. Other embodiments besides the one herein shown and described may be articulated as well, the terms and expressions therefore serve only to describe the invention by example only and not to limit the invention. It is expected that others will perceive differences which, while differing from the foregoing, do not depart from the spirit and the scope of the invention as herein described and claimed.

What I claim is:

1. A lightweight and portable touch activated flashlight apparatus for illuminating the keyboard of a remote control device, comprising:
   a mounting box consisting of an upper cover panel, and internal circuit board, and a lower cover panel;
   said upper cover panel having an outer surface, an inner surface and fastening means for fastening at least one magnet to said inner surface of said upper cover panel;
   said at least one magnet being configured and arranged when fastened to said inner surface of said upper cover panel to releasably affix the flashlight apparatus to the remote control device;
   means extending downwards through said upper cover panel for releasably securing said upper cover panel to said internal circuit board;
   a support stem mounted to said mounting box for placement of a distal end over different selected portions of said keyboard;

a light source supported by said support stem for direction of the light over said different portions of said keyboard; .

touch activated switching means integrally formed on said internal circuit board for switching on said light source when the apparatus is held by the user; and an energy means connected to said light source through said switching means for providing the requisite amount of voltage for powering said light source.

2. The touch activated switching means as described in claim 1 wherein said lower cover panel includes means for fastening said lower cover panel to said internal circuit board, said lower cover panel having at least one touch sensitive surface panel attached thereto.

3. The touch activated switching means as described in claim 2 wherein said touch sensitive surface panel is operationally connected to said switching means.

4. The touch activated switching means as described in claim 3 wherein said switching means and said surface panels are arranged to form a circuit, said circuit providing conductivity from said energy means for said light source when said circuit is complete.

5. Said touch activated flashlight as described in claim 1 wherein said touch activated switching means is an electronic switch configured to complete a circuit to illuminate said light source when activated, said electronic switch being actuated when said touch sensitive surface panels are simultaneously touched by the user.

6. The touch activated flashlight as described in claim 2, wherein said electronic switch is a field effect transistor, said field effect transistor being connected to a first and a second touch sensitive surface panel such that, when said first and said second touch sensitive surface panels are simultaneously touched, a conductive circuit is completed and said light source is energized and illuminated by said energy means.

7. The touch activated flashlight as described in claim 1, wherein said touch activated switching means completes an electronic circuit, said electronic circuit having capacitor means for preventing excess voltage through said circuit and resistor means for discharging any excess voltage.

8. The touch activated flashlight as described in claim 1, wherein said energy means is a battery having a voltage sufficient to provide an electrical supply to illuminate said light source when said switching means is activated.

9. The touch activated flashlight as described in claim 1, wherein said light source and said adjustable stem are configured and arranged with respect to said upper cover panel, said lower cover panel and said internal circuit board so that said light source can be selectively positioned above the remote control keyboard to prevent undesirable reflection of the light and to further increase illumination of the keyboard.

10. The touch activated flashlight as described in claim 1, wherein said light source is enclosed in a spherical housing, said housing being attached to said adjustable stem and having an upper portion and a lower portion, said upper portion being treated with a reflective opaque substance, said lower portion forming a protective lens, said sphere configured to increase the intensity and the focusing of the light for optimum illumination of the remote control keyboard.

11. The touch activated flashlight as described in claim 1, wherein at least one magnetically attracted panel is adhesively secured to the underside of the remote control device, said at least one magnetically attracted panel being positioned to magnetically attach to said upper cover panel having said at least one magnet fastened thereto.

12. An illumination device for a keyboard console, comprising:

at least one light source;

a control box having a switching means for selectively providing an electric current to illuminate said light source;

said control box having an upper cover panel, a lower cover panel, and an internal circuit board panel;

a post assembly adjustable for positioning at various selected positions directly over the keyboard console;

said light source being supported on a distal end of said post assembly and being connected to said control box;

touch activated switching means for activating said light source to illuminate the keyboard console;

said touch activated switching means for activating said light source when the user simultaneously makes contact with a touch sensitive plate located on said lower cover panel;

said plate being optionally connected to said switching means so as to complete an electric circuit for illuminating said light source; and said control box having means for releasably attaching said control box to the body of the keyboard console.

13. The illumination device as described in claim 12, wherein said lower cover panel has an electrically conductive strip adhesively attached thereto, said strip being operationally connected to said switching means.

14. The illumination device as described in claim 12, wherein said light source and said post assembly are configured and arranged with respect to said upper cover panel, said lower cover panel and said internal circuit board so that said light source can be selectively positioned above the remote control keyboard to prevent undesirable reflection of the light and to further increase illumination of the keyboard.

* * * * *